United States Patent
Irle

(10) Patent No.: US 11,215,005 B2
(45) Date of Patent: Jan. 4, 2022

(54) VEHICLE FLAP COVER SYSTEM AND A METHOD FOR AUTOMATICALLY ACTUATING THE FLAP COVER

(71) Applicant: HELLA GmbH & Co. KGaA, Lippstadt (DE)

(72) Inventor: Henning Irle, Lippstadt (DE)

(73) Assignee: Hella GmbH & Co. KGaA, Lippstadt (DE)

(*) Notice: Subject to any disclaimer, the term of this patent is extended or adjusted under 35 U.S.C. 154(b) by 296 days.

(21) Appl. No.: 16/440,519

(22) Filed: Jun. 13, 2019

(65) Prior Publication Data
US 2019/0292830 A1 Sep. 26, 2019

Related U.S. Application Data

(63) Continuation of application No. PCT/EP2017/080510, filed on Nov. 27, 2017.

(30) Foreign Application Priority Data

Dec. 13, 2016 (DE) .................. 10 2016 124 155.5

(51) Int. Cl.
*E05F 15/00* (2015.01)
*E05F 15/614* (2015.01)
(Continued)

(52) U.S. Cl.
CPC ............ *E05F 15/614* (2015.01); *B60K 15/05* (2013.01); *B60L 53/16* (2019.02);
(Continued)

(58) Field of Classification Search
CPC ............ B60K 15/05; B60K 2015/0576; B60K 2015/053; B60K 2015/0538; B60L 53/16;
(Continued)

(56) References Cited

U.S. PATENT DOCUMENTS 6,922,378 B2 7/2005 Shen
6,922,387 B1 7/2005 Shen
(Continued)

FOREIGN PATENT DOCUMENTS

CN 1512498 A 7/2004
DE 10050558 A1 4/2002
(Continued)

OTHER PUBLICATIONS

International Search Report dated Mar. 15, 2018 in corresponding application PCT/EP2017/080510.

*Primary Examiner* — Chi Q Nguyen
(74) *Attorney, Agent, or Firm* — Muncy, Geissler, Olds & Lowe, P.C.

(57) ABSTRACT

A system having a cover for a motor vehicle, in particular a fuel cap or a charging port cover, an electromotive actuator with an output and an electric motor, and an electric motor controller, wherein the electric motor of the actuator can be controlled via the motor controller as a function of an electric actuation signal such that the output of the actuator transfers the cover to an open position or a closed position. In order to realize the automatic opening or closing of a cover for a motor vehicle using simple circuit technology, it is proposed that the actuation signal can be generated by an external movement of the output. Furthermore, a method for automatically actuating a cover is provided.

13 Claims, 1 Drawing Sheet

(51) Int. Cl.
B60L 53/16 (2019.01)
B60K 15/05 (2006.01)

(52) U.S. Cl.
CPC ............. *B60K 2015/053* (2013.01); *B60K 2015/0538* (2013.01); *B60K 2015/0576* (2013.01); *E05Y 2201/434* (2013.01); *E05Y 2201/71* (2013.01); *E05Y 2900/534* (2013.01)

(58) Field of Classification Search
CPC ........ E05F 15/614; Y02T 90/14; Y02T 10/70; Y02T 10/7072; E05Y 2201/434; E05Y 2201/71; E05Y 2900/534
USPC ............................................................. 49/31
See application file for complete search history.

(56) References Cited

U.S. PATENT DOCUMENTS

| | | | | |
|---|---|---|---|---|
| 7,185,938 | B2* | 3/2007 | Beck | B60K 15/04 292/207 |
| 7,258,245 | B2* | 8/2007 | Bauer | B60K 15/0406 220/211 |
| 9,139,085 | B2 | 9/2015 | Frommann et al. | |
| 10,052,947 | B2 | 8/2018 | Herrmann et al. | |
| 10,384,534 | B2* | 8/2019 | Guardianelli | E05B 83/34 |
| 10,442,303 | B2* | 10/2019 | Lee | B60L 53/14 |
| 2004/0094230 | A1* | 5/2004 | Ono | F17C 6/00 141/286 |
| 2005/0156547 | A1* | 7/2005 | Gregori | E05F 15/41 318/282 |
| 2007/0243775 | A1* | 10/2007 | Osakabe | F02B 61/045 440/76 |
| 2009/0151256 | A1* | 6/2009 | Koncelik, Jr. | E06B 5/01 49/31 |
| 2013/0154402 | A1* | 6/2013 | Basavarajappa | H02K 7/06 310/20 |
| 2013/0249234 | A1* | 9/2013 | Higgins | B60K 15/05 296/97.22 |
| 2015/0048644 | A1* | 2/2015 | Georgi | H03K 17/97 296/97.22 |
| 2017/0182882 | A1* | 6/2017 | Persiani | F16H 25/18 |

FOREIGN PATENT DOCUMENTS

| | | |
|---|---|---|
| DE | 10334719 A1 | 2/2005 |
| DE | 102012104986 A1 | 12/2012 |
| DE | 102012018489 A1 | 3/2014 |
| DE | 102013018859 A1 | 7/2015 |
| DE | 102014201886 A1 | 8/2015 |
| DE | 102015214781 A1 | 9/2016 |

* cited by examiner

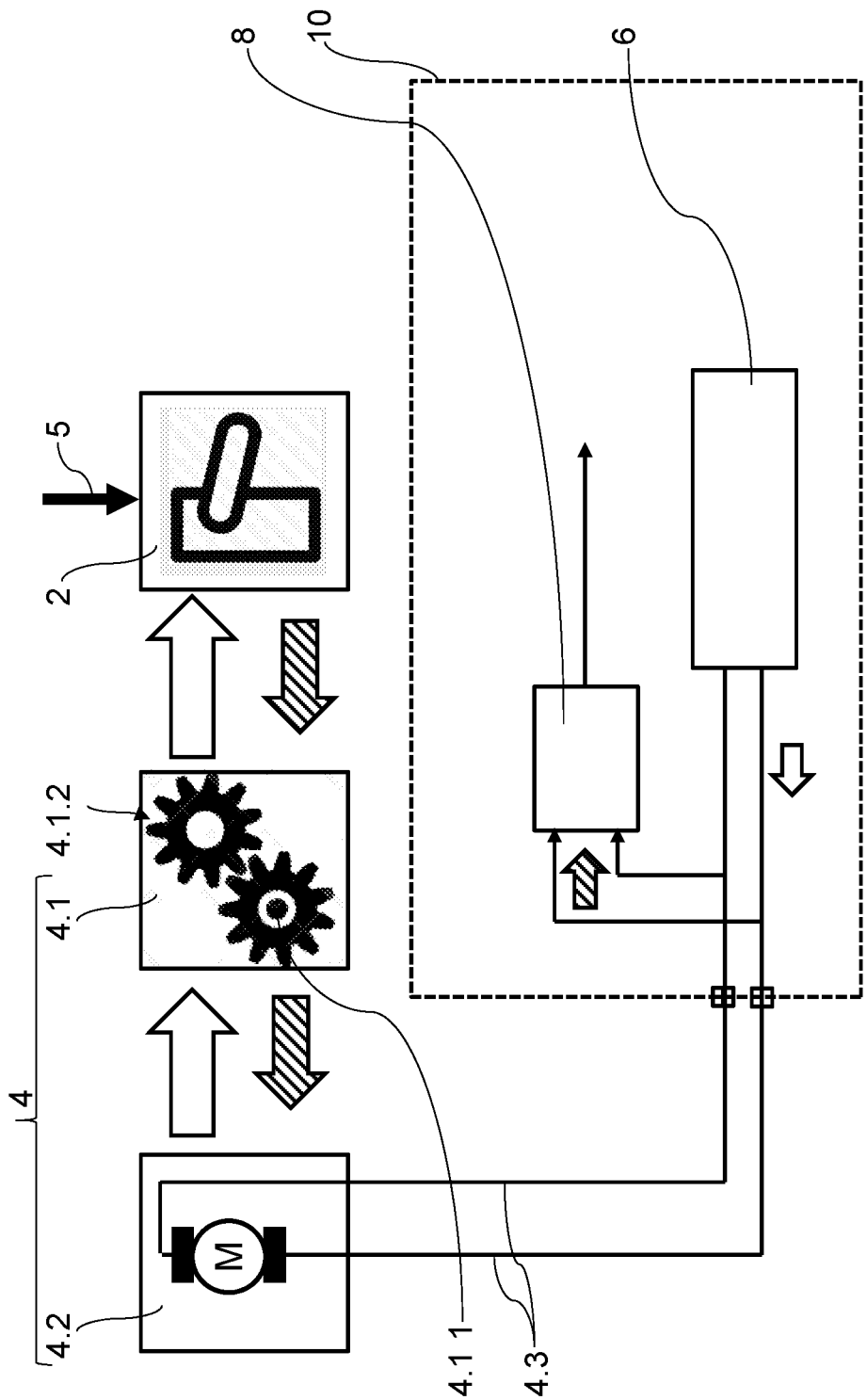

VEHICLE FLAP COVER SYSTEM AND A METHOD FOR AUTOMATICALLY ACTUATING THE FLAP COVER

This nonprovisional application is a continuation of International Application No. PCT/EP2017/080510, which was filed on Nov. 27, 2017, and which claims priority to German Patent Application No. 10 2016 124 155.5, which was filed in Germany on Dec. 13, 2016, and which are both herein incorporated by reference.

BACKGROUND OF THE INVENTION

Field of the Invention

The present invention relates to a system which has a cover for a motor vehicle, in particular a fuel cap or charging port cover, an electromotive actuator, with an output and an electric motor, and an electric motor controller, wherein the electric motor can be controlled by means of the motor controller as a function of an electrical actuation signal in such a way that the output of the actuator transfers the cover to an open position or a closed position. Furthermore, the invention relates to a method for automatically actuating a cover.

Description of the Background Art

DE 103 34 719 A1 discloses a device in which a motor drive is operated to transfer a fuel cap to its open or closed position on the basis of a switch-on command or in response to a signal given by a person or a filling device. The open position and the closed position of the fuel cap is detected by means of Hall sensors so as to automatically turn off the motor drive. As an alternative to using Hall sensors, according to DE 103 34 719 A1, it can also be detected whether or not the open or closed position has been reached by evaluating the current and/or voltage characteristic of the motor drive.

SUMMARY OF THE INVENTION

It is therefore an object of the present invention to provide an automatic opening or closing of a cover for a motor vehicle using simple circuit technology.

An advantage of the invention is in particular that no sensors, such as probes, proximity switches or the like, or remote controls are required to generate an actuation signal for an electromotive actuator of a cover of a motor vehicle. This allows for the use of a simple electrical circuit for controlling an electric motor of the electromotive drive by means of a motor controller. In addition, components, cabling and space are saved, whereby a compact and inexpensive construction of the inventive system with low weight can be achieved.

Basically, the external movement of the output of the actuator is freely selectable within broad suitable limits according to type, force introduction, force amplitude, direction of action and duration. Suitably, it is provided that the actuation signal can be generated by means of an external movement of the output against a thus triggered actuating movement of the output. For example, transferring the cover to an open position would therefore require as an actuation signal an external movement of the output in the direction of a closed position of the cover, and vice versa. If the output is, for example, a shaft with a spur gear or the like, then the external movement would need to cause the spur gear and thus the shaft to rotate against the direction of rotation that corresponds to the opening of the cover, and vice versa.

A particularly advantageous embodiment of the system according to the invention provides that the external movement of the output can be generated by a force applied to the cover. In this way, an additional handle or the like and a corresponding coupling structure between the handle and the output of the actuator is no longer necessary.

Another particularly advantageous embodiment of the system according to the invention provides that the actuation signal is designed as an electrical voltage which can be induced by means of the electric motor as a function of the external movement of the output. As a result, the configuration of the system according to the invention is further simplified.

The same applies to a particularly advantageous development of the method according to the invention, according to which the actuation signal is designed as an electrical voltage which is induced by means of the electric motor as a function of the external movement of the output.

The electric motor of the actuator can be connected to the motor controller by means of at least one electrical supply line, and by means of this at least one electrical supply line, is connected to an evaluation circuit, and the actuation signal can be transmitted by means of this at least one supply line to the evaluation circuit. In this way, the configuration of the system according to the invention is additionally simplified.

The same applies to an advantageous development of the method according to the invention, which provides that the electric motor of the actuator is connected to the motor controller by means of at least one electrical supply line, and by means of this at least one electrical supply line, is connected to an evaluation circuit, and the actuation signal is transmitted to the evaluation circuit by means of this at least one supply line.

Also, the motor controller and the evaluation circuit can be structurally combined in a unit. In this way, a higher degree of integration and thus further space and cost savings is possible.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which are given by way of illustration only, and thus, are not limitive of the present invention, and wherein the FIGURE illustrates an embodiment of the system according to the invention in a rough schematic representation.

DETAILED DESCRIPTION

The only FIG. 1 shows an embodiment of the system according to the invention. The system has a cover 2 designed as a fuel cap of a motor vehicle, not shown, which by means of an electromotive actuator 4 can be transferred from a closed position to an open position and from the open position to the closed position. In the closed position, the filling opening of a motor vehicle tank is covered by the fuel cap 2 in a manner known to the person skilled in the art. In the open position, the filling opening of the motor vehicle tank is accessible from the outside, so that a nozzle of a fuel dispensing system can be inserted into the filling opening of the motor vehicle tank. The opened and closed position of the fuel cap 2 as well as the filling opening of the motor vehicle tank and the motor vehicle tank are not shown.

The electromotive actuator 4 has an output 4.1 for the actuation of the fuel cap 2, i.e., for transferring it to the open or closed position, which, in addition to a shaft 4.1.1 driven by an electric motor 4.2 of the actuator 4, has a gear 4.1.2 designed as a spur gear.

The electric motor 4.2 of the actuator 4 is electrically conductively connected with a motor controller 6 by means of two electrical supply lines 4.3. In the present embodiment, the two supply lines 4.3 are additionally electrically conductively connected, i.e., in a signal-transmitting manner, with an evaluation circuit 8. To generate an actuation signal, the evaluation circuit 8 is also connected to the motor controller 6 in a signal-transmitting manner. The motor controller 6 and the evaluation circuit 8 are structurally combined in one unit 10.

Below, the operation of the system according to the invention and the inventive method according to the present embodiment will be explained in more detail with reference to FIG. 1. The signal chain is symbolized in FIG. 1 by the crosshatched arrows and the adjusting chain is symbolized in FIG. 1 by the arrows without crosshatching.

It is initially assumed that the fuel cap 2 is in its closed position and the electric motor 4.2 of the actuator 4 is not energized. To refuel the motor vehicle at a gas station pump, the driver or another person presses the fuel cap 2 to be opened from the outside, the same as the push-push opening mechanisms of the fuel caps known from the prior art. This force on the fuel cap 2, symbolized by an arrow 5 in FIG. 1, is indirectly transmitted to the not-shown rotor of the electric motor 4.2 by means of the spur gear 4.1.2 and the shaft 4.1.1 of the output 4.1.

The pressure 5 on the fuel cap 2 leads to a rotational movement of the shaft 4.1.1, which in turn leads to a rotational movement of the rotor of the electric motor 4.2. Since the pressure direction 5 extends opposite to the movement of the fuel cap 2 during its transfer to the open position, the external movement of the output 4.1, i.e., of the spur gear 4.1.2 and the shaft 4.1.1, as well as of the rotor of the electric motor 4.2 accordingly also run opposite to the thus triggered actuating movement of the output 4.1, namely the transfer of the fuel cap 2 to its open position.

Due to the rotation of the rotor of the electric motor 4.2 by means of the external movement of the output 4.1, the electric motor acts as a generator 4.2. The voltage thus induced in the electrical supply lines 4.3 is also applied to the signal input of the evaluation circuit 8 by virtue of the signal-transmitting connection between the electrical supply lines 4.3 and the evaluation circuit 8. This input signal is processed and reprocessed in the evaluation circuit 8 in a manner known to those skilled in the art and leads to an actuation of the actuator 4 by the motor controller 6 in such a way that the actuator 4 automatically transfers the fuel cap 2 to its open position via the output 4.1. The input signal applied to the evaluation circuit 8 is thus formed as an electrical voltage, which is induced by means of the electric motor 4.2 as a function of the external movement of the output 4.1.

The input signal generated in the above manner is thus an electrical actuation signal for controlling the electromotive actuator 4 by means of the motor controller 6 for purposes of transferring the fuel cap 2 from its closed position to its open position via the output 4.1 of the actuator 4. In the open position, the fuel cap 2 protrudes approximately at an angle of 90° from the vehicle body so that the fuel nozzle can be inserted into the filling opening of the fuel tank.

If after refueling the fuel cap 2 is to be transferred back from its open position to the closed position, the driver or any other person again presses against the fuel cap 2. However, in this case the pressure on the fuel cap 2 is applied to the fuel cap 2 from the inside, i.e. its inside that is not shown. Accordingly, the external movement of the output 4.1 for triggering the actuation signal for an actuating movement of the output 4.1 in order to transfer the fuel cap 2 from its open position to its closed position also takes place against the adjusting movement of the output 4.1.

In comparison to the external movement of the output 4.1 for transferring the fuel cap 2 to the open position, the spur gear 4.1.2 and the shaft 4.1.1 of the output 4.1 as well as the rotor of the electric motor 4.2 are now rotated in the opposite direction. The electric motor 4.2 again acts as a generator, and again an electrical voltage is applied as an input signal at the two supply lines 4.3 as well as at the evaluation circuit 8 connected thereto in a signal-transmitting manner. However, in comparison to the previously described external movement of the output 4.1 and thus of the rotor of the electric motor 4.2, this electrical voltage is of opposite sign, which leads to another actuation of the actuator 4 by the motor controller 6. Namely to an adjusting movement of the actuator 4 corresponding to transferring the fuel cap 2 from the open position to the closed position. The input signal now applied to the evaluation circuit 8 is thus, in turn, embodied as an electrical voltage, which is induced by means of the electric motor 4.2 as a function of the external movement of the output 4.1.

The input signal generated in the aforementioned manner is thus an electrical actuation signal for actuating the electromotive actuator 4 by means of the motor controller 6 in order to transfer the fuel cap 2 from its open position to its closed position via the output 4.1 of the actuator 4.

The invention is not limited to the present exemplary embodiment. For example, it is not necessary for the output of the electromotive actuator to have a gear, in particular a spur gear. Also, any other suitable type of external movement of the output can be used, also in the direction of the actuating movement of the output triggered by the actuation signal.

The same applies to the type of electric motor of the electromotive actuator. The person skilled in the art will select the suitable means in accordance with their application.

The cover can also be a charging port cover, for example for an electric vehicle or a hybrid vehicle. However, other covers for a motor vehicle are also conceivable. The term "cover" is to be interpreted broadly and means any type of lid, covering or the like.

In the embodiment, the supply for the electric motor of the electromotive actuator is formed as an electrical two-wire supply line, i.e., as two electrical supply lines. However, it is also possible to use only a single-wire supply line and to connect one of the electrical connections of the electric motor to ground. If a brushless electric motor is used, multi-pole supply lines, in particular three supply lines, are also possible.

The invention thus combines the advantages of the proven operation of a cover known to drivers and other operators, in particular a fuel cap or a charging port cover, namely the push-push operation, with a simplified electrical circuit in an implementation using an electromotive actuator for the transfer of the cover to its open and/or closed position.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:

1. A system comprising:
a cover for a motor vehicle;
an electromotive actuator with an output and an electric motor; and
an electric motor controller,
wherein the electric motor is controllable as a function of an electric actuation signal via the electric motor controller such that the output of the electromotive actuator transfers the cover to an open position or a closed position, and
wherein the electric actuation signal is generated via a movement of the output caused by an outside force.

2. The system according to claim 1, wherein the electric actuation signal is generated via an external movement of the output against a triggered actuating movement of the output.

3. The system according to claim 2, wherein the external movement of the output is generated by a force applied to the cover.

4. The system according to claim 1, wherein the electric actuation signal is an electrical voltage that is induced by the electric motor as a function of an external movement of the output.

5. The system according to claim 1, wherein the electric motor of the electromotive actuator is connected to the electric motor controller by at least one electrical supply line connected to an evaluation circuit, and wherein the electric actuation signal is transmitted to the evaluation circuit by the at least one electrical supply line.

6. The system according to claim 5, wherein the electric motor controller and the evaluation circuit are structurally combined into one unit.

7. The system according to claim 1, wherein the cover is a fuel cap or a charging port cover.

8. The system according to claim 1, wherein the output is an output drive having a drive shaft and a gear.

9. A method for automatic actuation of a cover of a system for a motor vehicle, the method comprising:
providing an electromotive actuator with an output and an electric motor;
providing an electric motor controller;
controlling the electric motor as a function of an electric actuation signal by the electric motor controller such that the output of the electromotive actuator automatically transfers the cover to an open position or a closed position; and
generating the electric actuation signal via an external movement of the output.

10. The method according to claim 9, wherein the electric actuation signal is an electrical voltage that is induced by the electric motor as a function of the external movement of the output.

11. The method according to claim 9, wherein the electric motor of the electromotive actuator is connected to the electric motor controller by at least one electrical supply line and is connected to an evaluation circuit, and wherein the actuation signal is transmitted to the evaluation circuit by the at least one electrical supply line.

12. The method according to claim 9, wherein the cover is a fuel cap or a charging port cover.

13. The method according to claim 9, wherein the output is an output drive having a drive shaft and a gear.

* * * * *